H. M. Corert,
Permutation Lock.
No. 1725. Reissued July 12, 1864.
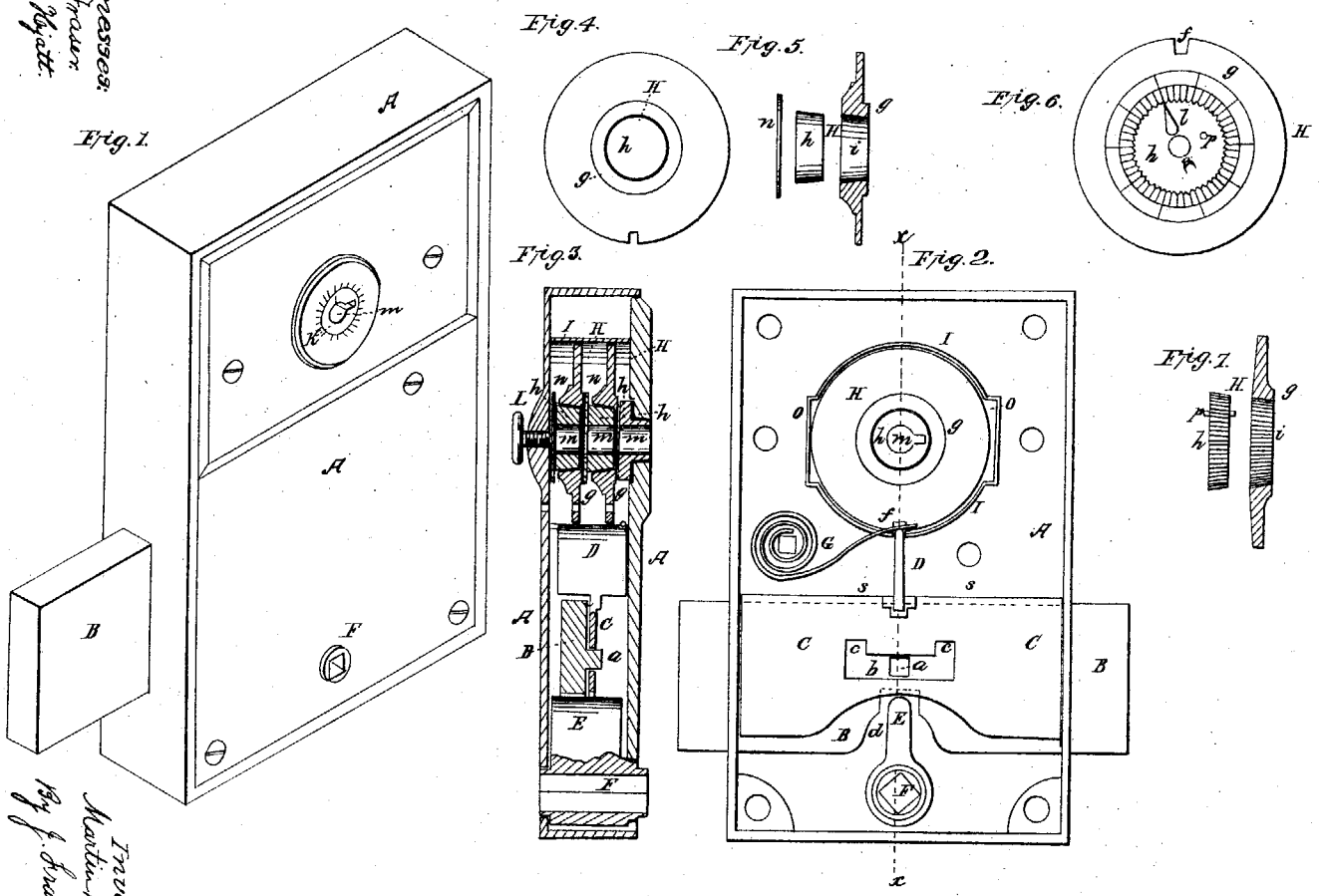
Witnesses:
J. Fraser.
Jay Hyatt.
Inventor:
Martin Briggs.
By J. Fraser & Co.
Attys.
AM. PHOTO-LITHO. CO. N.Y. (OSBORNE'S PROCESS.)

UNITED STATES PATENT OFFICE.

MARTIN BRIGGS, OF ROCHESTER, NEW YORK, ASSIGNEE OF H. W. COVERT.

IMPROVEMENT IN LOCKS.

Specification forming part of Letters Patent No. 18,228, dated September 15, 1857; Reissue No. 1,725, dated July 12, 1864.

*To all whom it may concern:*

Be it known that H. W. COVERT, of Rochester, in the county of Monroe and State of New York, did invent certain new and useful Improvements in Permutation-Locks, for which Letters Patent of the United States were granted to him on the 15th day of September, 1857, and for an additional improvement of the same, on the 1st day of March, 1859, of which Letters Patent I, MARTIN BRIGGS, of Rochester, aforesaid, am the sole assignee; and I do hereby declare that the follwing is a full and exact description thereof, reference being had to the accompanying drawings, making part of this specification.

Figure 1 is a perspective view of my improved lock; Fig. 2, an elevation of the same with the back plate removed for the purpose of exhibiting the operating parts; Fig. 3, a vertical transverse section in the plane of line *x x*, Fig. 2; Figs. 4, 5, 6, and 7, views showing the construction and arrangement of the permutation-wheels and the stationary washers connected therewith.

Like letters of reference indicate corresponding parts in all the figures.

This invention consists, first, in forming the permutation-wheels, respectively, of two parts—an outer rim or ring and an adjustable center—so arranged that the combination may be changed by merely turning the center to a different position; second, in combination with suitable permutation-wheels arranged on a common axis, the use of stationary or non-revolving washers in such a manner as to allow each wheel to turn independently of the others; and, third, in combination with permutation-wheels and washers, the employment of an outer box or cylinder that retains them in place.

As represented in the drawings, A is a suitable case of ordinary construction; B, the bolt, and C the tumbler. The bolt is provided with a projection, *a*, that fits in a slot, *b*, in the tumbler, having notches or indentations *c c* at each end, which fall over the projection *a* at the extreme of each throw, to hold said bolt in place. The bolt is also provided with slots *s s*, (shown in dotted lines in Fig. 2,) adapted to receive a tongue or dog, D, forming an extension of the tumbler. The tumbler moves vertically in the case A, being operated by a bit, E, of a stationary turning key, F, which bit rests under the tumbler and also within a socket, *d*, of the bolt, which is thrown by it. The tumbler is pressed down by a suitable spring, G, resting on it, Fig. 2, and it can rise to release the bolt only when the tongue or dog D comes in coincidence with all the notches *f f* of the permutation-wheels H H, which can only be when the said wheels are set with the notches on a line, when the tongue will then rise in them.

Thus far the arrangement does not differ essentially from others in use before this invention, and these parts may be changed or modified as convenience or necessity may require.

At a suitable position within the case A, and transversely of it, is situated a box, I, Figs. 2 and 3, preferably in the form of a cylinder, and in this box are situated the permutation-wheels H H, consisting of two or more, as may be desired. The box allows the wheels a free turning motion, but retains them perfectly in place.

The permutation-wheels are made in two parts—an outer rim or ring, *g*, of proper size or form, and a center, *h*, that fits the opening *i* in the rim or ring. I prefer to make these parts as shown in Figs. 6 and 7—that is, with the opening *i* of the rim *g* and the corresponding periphery of the center *h* corrugated, notched, or cogged, and fitting closely each into the other. If desired, they may be made plain, as shown in Figs. 4 and 5, and held together by their friction; or they may be secured in various other ways that will be readily suggested. By this means I am enabled to change the combination at any time by simply changing the position of the center *h* in the opening *i*. By the use of two or three wheels I am enabled to make several millions of changes, so that it is comparatively impossible to open the lock without knowing at what number it is set. As shown in the drawings, the head of the centers *h* project a little distance outside the rims or rings *g* in such a manner that they may be acted on from the back side of the lock by means of a screw, L, which presses the said centers into their respective rims, and thus tightens them there.

The method of setting permutation-wheels prior to this invention was by the use of a double set of wheels, one set of which was used only to set the other. This arrangement was very complicated and costly, and a lock thus formed was very liable to disarrangement.

My device is very simple, cheap, and cannot get disarranged, while by merely making a partial turn of the adjustable center the combination is changed at once.

In Fig. 6 the rim or ring is represented as provided with a suitable scale, and the center with a hand or index, *l*. By setting the center, and with it the index, to any number the combination will be correspondingly changed, so that by turning the wheels the proper number of times the notches *f f* therein will be brought into line, so that the tongue D of the tumbler may be raised to release the bolt. Instead of this, any arrangement that will accomplish the same result may be employed.

In Figs. 1 and 3 a turning disk, K, is shown, having an index that points to a scale outside it on the face of the lock. A key fits into the key-hole *m* of this disk, and by turning the index to a certain number, and also turning the centers in the same manner to the same position, the combination will be changed. This arrangement is inferior to that before described.

Between the permutation-wheels are respectively situated washers *n n*, Figs. 3 and 5, of any suitable form, which, while the permutation-wheels themselves have a free turning action, are stationary or non-revolving. They may be retained in place in the box I by any convenient means, that represented in the drawings being channels or indentations *o o*, Fig. 2, in which their edges rest. These washers are indispensable to keep the faces of the permutation-wheels from coming in contact, and thus producing friction, so that as one is turned its neighbor will also be turned. In unlocking the bolt the rear wheel is first turned till its notch *f* comes in position, and this must then remain stationary while the next wheel is brought in position, &c. Therefore it is apparent that each wheel must turn independently of the others, and that the washers are necessary to accomplish this result.

The permutation-wheels may be turned to lock or unlock the bolt by any suitable means.

In Figs. 1, 2, and 3 the key-hole *m* is represented as passing through all the wheels, as well as the back of the case. The key is first inserted through to the back wheel, which is brought into position. It is then withdrawn sufficiently to disengage it with that wheel, but bring it into engagement with the next, and so on till the whole are in position. By this arrangement the combination of the wheels can be readily changed without removing the wheels from the case, as is necessary in most devices, for it is required only to loosen the screw L, which correspondingly loosens the centers *h* from the rings *g*, thereby allowing the said centers to be turned by the key independently from the rim, and when the change is made a simple turn of the screw L fixes the centers in place again, and the combination is complete. This result is attained by the projection of the centers from the faces of the rim so that the screw can be made to bear on them. If desired, however, the wheels may be taken out of the case for adjustment; but even in this case the screw performs an important function in tightening them at all times.

What I claim as the invention of the said H. W. COVERT is—

1. The plane or corrugated center *h*, as described, in combination with the ring or rim *g*, the whole arranged in the manner and operating as herein specified.

2. In combination with a set of permutation-wheels, H H, the stationary washers *n n*, operating substantially in the manner and for the purpose herein specified.

3. In combination with a set of permutation-wheels, H H, and stationary intermediate washers, *n n*, the inclosing-box I, substantially as described.

In witness whereof I have hereunto signed my name in the presence of two subscribing witnesses.

MARTIN BRIGGS.

Witnesses:
R. F. OSGOOD,
J. S. BROOKS.